United States Patent [19]

Tanaka et al.

[11] 4,445,488
[45] May 1, 1984

[54] EXHAUST GAS RECIRCULATION CONTROL FOR DIESEL ENGINE

[75] Inventors: Takeshi Tanaka; Hisasi Kawai, both of Toyohashi; Toshihiko Igashira, Toyokawa; Kiyonori Sekiguchi, Aichi; Mitsumasa Yamada, Mishima; Michio Kawagoe, Susono; Masaaki Tanaka, Susono, all of Japan

[73] Assignees: Nippon Soken, Inc., Nishio; Toyota Jidosha Kabushiki Kaisha, Toyota, both of Japan

[21] Appl. No.: 435,301

[22] Filed: Oct. 19, 1982

[30] Foreign Application Priority Data

Oct. 20, 1981 [JP] Japan .................................. 56-166424

[51] Int. Cl.³ ............................................. F02M 25/06
[52] U.S. Cl. ..................................... 123/569; 123/571; 60/605; 60/611; 60/614
[58] Field of Search ........................ 123/569, 571, 568; 60/602, 605, 611, 614

[56] References Cited

U.S. PATENT DOCUMENTS

4,369,753 1/1983 Sugiyama ............................ 123/569

FOREIGN PATENT DOCUMENTS

| 54-17421 | 2/1979 | Japan | 123/571 |
| 57-73823 | 5/1982 | Japan | 123/569 |
| 57-165654 | 10/1982 | Japan | 123/569 |
| 57-171057 | 10/1982 | Japan | 123/569 |

*Primary Examiner*—Wendell E. Burns
*Attorney, Agent, or Firm*—Cushman, Darby & Cushman

[57] ABSTRACT

In an apparatus for controlling the EGR in a diesel engine, a single pressure control valve adjusts the control pressure from a pump automatically when the pressure changes, and supplies the control pressure in response to the command signal of a control circuit to an EGR valve and a waste-gate valve of a turbocharger. The pressure control valve includes an electric actuator, a spool valve, a sleeve, a diaphragm, and a spring. By using this apparatus, a diesel engine which has a high response speed, high control precision, simple constitution, less nitrogen oxides in the exhaust gas, and low manufacturing cost is obtained.

8 Claims, 6 Drawing Figures

EXHAUST GAS RECIRCULATION CONTROL FOR DIESEL ENGINE

BACKGROUND OF THE INVENTION

1. Field of the Invention

The present invention relates to an apparatus for controlling exhaust gas recirculation (EGR) in a diesel engine.

2. Description of the Prior Art

In a diesel engine, EGR is used for reducing the nitrogen oxides (NOx) in exhaust gas. Excessive EGR, however, generates black smoke, therefore EGR should desirably be controlled finely in response to the engine speed and load.

A known EGR system enabling fine control of the amount of EGR is described below. The system uses a well known diaphragm type EGR valve and supplies to the diaphragm chamber of the EGR valve a vacuum adjusted for the most desirable amount of EGR for the engine speed and load.

More specifically vacuum from a pump is adjusted to a constant vacuum by a constant-pressure valve then supplied to the diaphragm chamber through an electromagnetic valve. An orifice leading to the atmosphere is provided in at least one portion of the wall sustaining the above-mentioned pressure. The amount of air passing through the orifice is controlled by the opening degree of the electromagnetic valve for control of the pressure of the diaphragm chamber of the EGR valve.

The opening degree of the electromagnetic valve is controlled by the ratio of the conducting time to non-conducting time of the electric current applied thereto. The electric current is turned on and off by the output of an electronic circuit.

The diameter of the orifice is an important factor in achieving precise control in this system. Too large a diameter of the orifice would reduce the range of opening degree of the electromagnetic valve able to control the amount of EGR. Conversely, reduction of the diameter of the orifice to one assuring a certain range of control would result in the EGR valve not being able to respond quickly enough to rapid changes in the driving conditions, leading to inappropriate EGR amounts. As a result, when the engine load increases rapidly, the excessive EGR would cause a great amount of the black smoke.

To deal with this problem, the diameter of the orifice has been set to one with a finely EGR controllable size. Rapid changes in the engine load have been detected so as to supply electric current to the electromagnetic valve, provided in the bypass path of the orifice, to open the path and instantly return the diaphragm chamber of the EGR valve to atmospheric pressure, thereby improving the response of the EGR valve and preventing the exhaust of black smoke due to the excess of the amount of EGR. The above-mentioned system, however, requires a vacuum source, a constant-pressure valve, an orifice, an electromagnetic valve controlled by an electric signal having a duty cycle, an electromagnetic valve provided in the bypass path, an EGR valve, a sensor for the lever opening degree, a sensor of the engine speed, and a control circuit. Such an EGR system therefore suffers from the demerit of too many parts.

The present invention is proposed in order to eliminate the above-mentioned demerit.

SUMMARY OF THE INVENTION

The object of the present invention is to provide an apparatus for controlling the EGR in a diesel engine in which, by using a spool valve and by combining the constant-pressure valve and electromagnetic valve, a high response speed, high control precision, and small number of constituent parts can be achieved, thereby enabling a diesel engine emitting low amounts of nitrogen oxides in the exhaust gas and being cheaper to manufacture.

DESCRIPTION OF THE PREFERRED EMBODIMENTS

Figure 1:
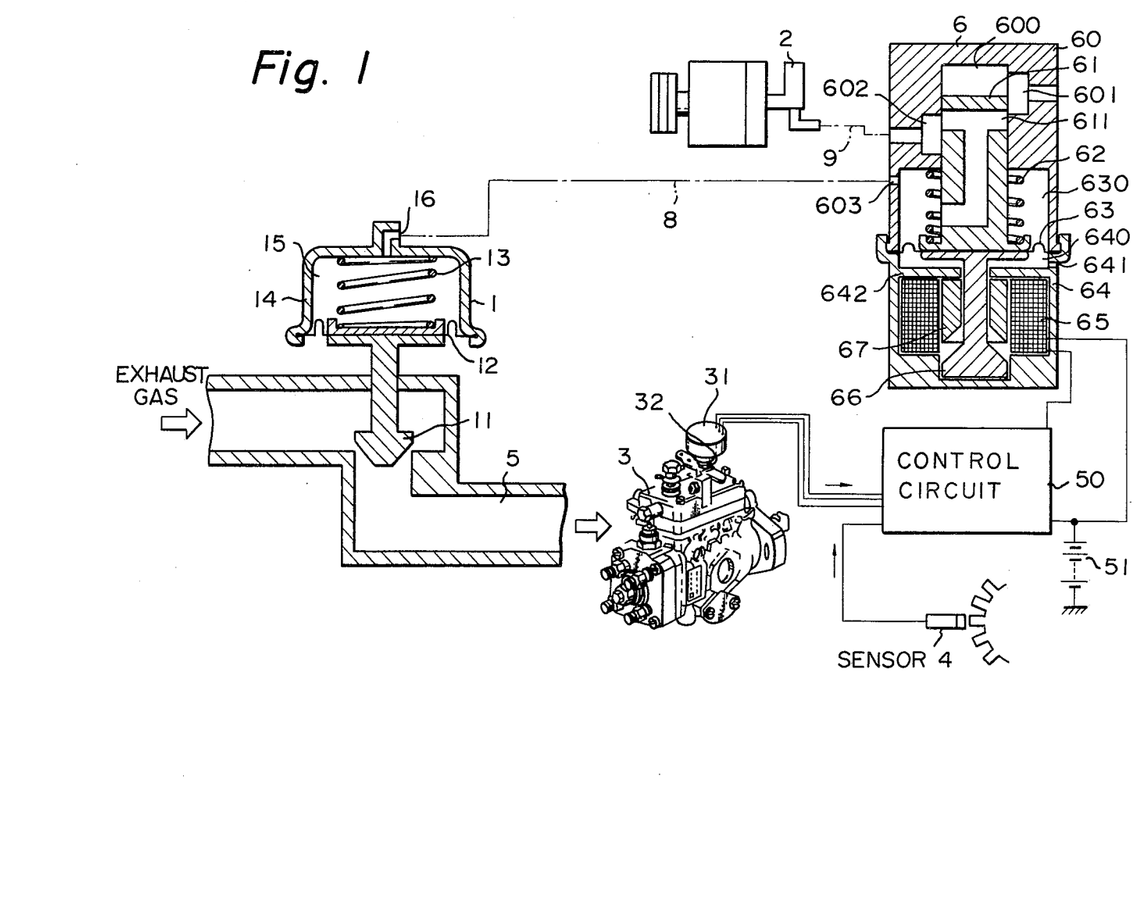
FIG. 1 is a schematic diagram illustrating the constitution of an apparatus for controlling EGR in a diesel engine according to a first embodiment of the present invention.

In FIG. 1, an apparatus for controlling EGR in a diesel engine according to a first embodiment of the present invention is shown. The main elements of the apparatus are an EGR valve 1, a vacuum pump 2, a constant-pressure valve 6, a variable resistor 31 linked with a rotary shaft 32 in a distributing type fuel injection pump 3, an electromagnetic pickup 4 for detecting the engine speed, and a control circuit 50.

The EGR valve 1 is located at the middle of an EGR pipe 5 which connects an intake pipe with an exhaust pipe in the diesel engine. The EGR valve 1 includes a valve body 11, a diaphragm 12, a compression spring 13, and a casing 14. The valve body 11 moves up and down together with the diaphragm 12. When the lift value is zero, the EGR pipe 5 is closed. The casing 14 and the diaphragm 12 define a diaphragm chamber 15. Vacuum is applied to the diaphragm chamber 15 by the constant-pressure valve 6 through an aperture 16 provided on the casing 14. The vacuum causes the diaphragm 12 to lift the valve body 11 against the spring 13. The larger the lift, the greater the sectional area of the passage of the EGR pipe 5.

The elements of the constant-pressure valve 6 are a valve casing 60, a spool valve body 61, a spring 62, a diaphragm 63, a solenoid coil 65, a solenoid casing 64, a plunger 66, and a core 67. The spool valve body 61 moves up and down together with the diaphragm 63 and the plunger 66. A sleeve 600 provided in the valve casing 60 has an atmosphere port 601, which opens to the atmosphere, and a vacuum port 602, which opens to the vacuum pump 2. The spool valve body 61 is fitted to the sleeve 600. The spool valve body 61 has a path 611 which opens to the atmosphere port 601 and/or the vacuum port 602 and also opens to a vacuum chamber 630 defined by the diaphragm 63 and the valve casing 60.

The solenoid coil 65 is fixed to a rib 642 provided in the solenoid casing 64 and to the solenoid casing 64. At the center of the solenoid coil 65, the core 67 is located. At the center of the core 67, the plunger 66 is fitted to the core 67. An atmosphere chamber 640 defined by the solenoid casing 64 and the diaphragm 63 opens to the atmosphere through a path 641 provided at the side of the solenoid casing 64. The aperture 16 of the EGR valve 1 opens to an aperture 603 at the side of the valve casing 60 through a pipe 8. In the drawings, air pipes are shown by chain lines and electric lines are shown by solid lines.

When electric current is applied to the solenoid coil 65, the solenoid coil 65 pushes up the plunger 66 to the position where the force of the spring 62 equals the electromagnetic force derived from the electric current. Since the spool valve body 61 is linked with the plunger 66, it is pushed up at the same time as the plunger 66. This increases the sectional area of the passage of the valve comprised of the path 611 provided in the spool valve body 61 and the atmosphere port 601 and conversely reduces the sectional area of the passage of the other valve comprised of the path 611 and the vacuum port 602.

The vacuum pump 2 is one of a well known constitution. A suction port of the vacuum pump 2 is connected to the vacuum pressure port 602 through a pipe 9. The variable resistor 31 is connected to the control circuit 50 through electric wire. The engine speed electromagnetic pickup 4 is connected to the control circuit 50.

Figure 2:
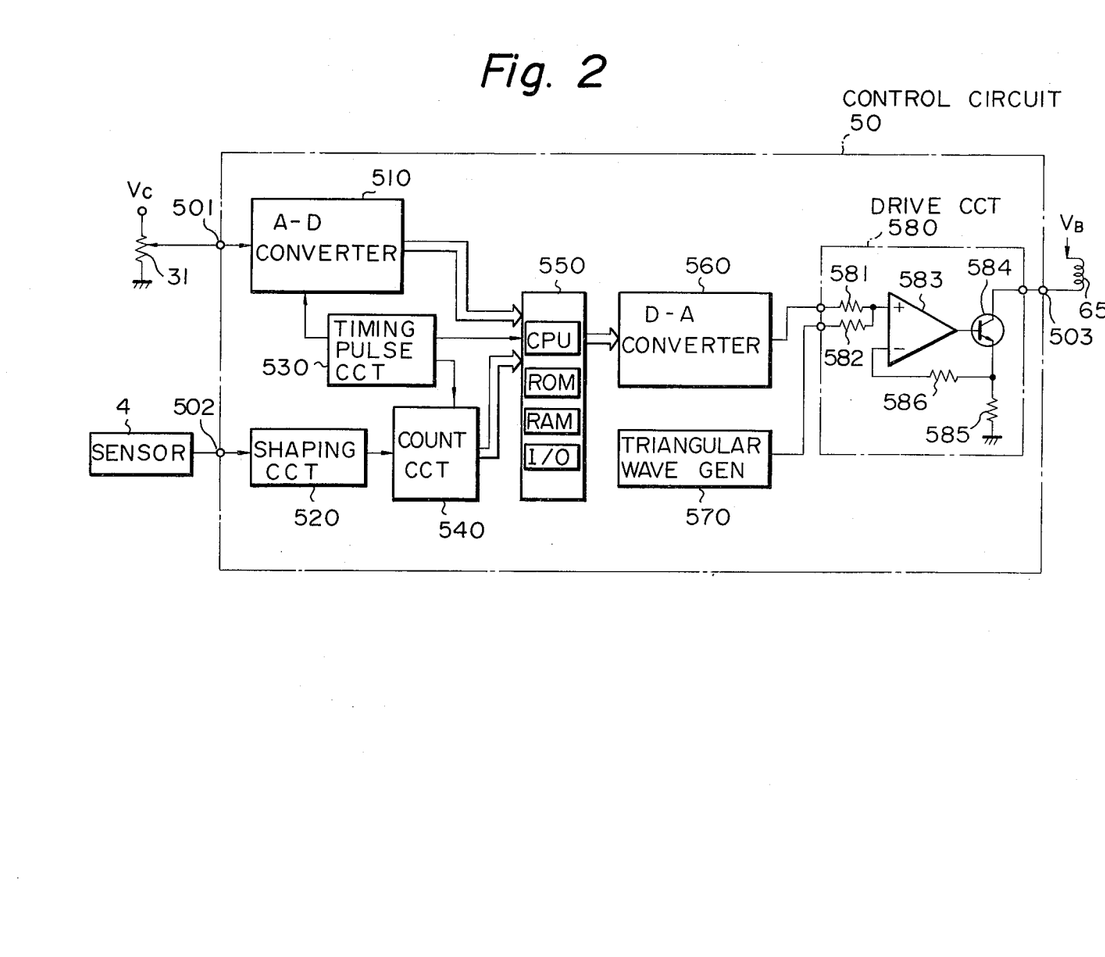
FIG. 2 is a block circuit diagram illustrating the control circuit in FIG. 1.

The control circuit 50 is explained below with reference to FIG. 2. An input terminal 501 is connected to the terminal of the sliding contact of the variable resistor 31. An input terminal 502 is connected to the output terminal of the engine speed electromagnetic pickup 4. An output terminal 503 is connected to one terminal of the solenoid coil 65 of the constant-pressure valve 6. The other terminal of the solenoid coil 65 is connected to the positive pole of a battery 51. An analog-to-digital (A-D) converter 510 receives the signal from the variable resistor 31 through the input terminal 501. The A-D converter 510 includes a scaling amplifier, an A-D converter circuit, a memory, and a timing pulse generation circuit for generating the start signal for A-D conversion and the latch signal for the memory. The output of the A-D converter 510 is 8 bits. A shaping circuit 520 shapes the signal from the engine speed electromagnetic pickup 4.

A timing pulse circuit 530 generates the A-D conversion timing signal for the A-D converter 510, the counting timing signal for a count circuit 540, explained hereinafter, and the timing signal for data input timing of a microcomputer 550, explained hereinafter. The timing pulse circuit 530 consists of an oscillator, counters, and logic circuits. The count circuit 540 includes a counting circuit for counting the output pulses from the shaping circuit 520, a memory for memorizing the counting value of the counting circuit, and a timing pulse generation circuit for generating the counting timing signal and the latch signal for memorizing after receiving the signal from the timing pulse circuit 530. The output of the count circuit 540 is a binary code of 8 bits.

The microcomputer 550 includes a central processing unit (CPU), an input/output unit (I/O), a read only memory (ROM), and a random access memory (RAM). A model 6802 by Motorola is used for the microcomputer. The circuit and the operation of the microcomputer are well known, so description of the same is omitted. The clock frequency in the microcomputer is 2 MHz. After applying the power, the microcomputer is initialized and starts to operate from the previously appointed address of a read only memory (ROM). The output of the microcomputer 550 is a binary code of 8 bits.

A digital-to-analog (D-A) converter 560 consists of an R-2R type ladder circuit network. A triangular wave generator 570 generates triangular waves of approximately 200 Hz. The output of the D-A converter 560 is supplied to one terminal of a resistor 581 in a drive circuit 580. The other terminal of the resistor 581 is connected to the non-inverting input terminal of an operational amplifier 583. The output of the triangular wave generator 570 is supplied to one terminal of a resistor 582. The other terminal of the resistor 582 is connected to the non-inverting input terminal of the operational amplifier 583. The output of the operational amplifier 583 is supplied to the base of an NPN transistor 584. The emitter of the transistor 584 is connected to one terminal of a resistor 585 and one terminal of a resistor 586. The other terminal of the resistor 585 is grounded. The other terminal of the resistor 586 is connected to the inverting input terminal of the operational amplifier 583. The collector of the transistor 584 is connected to the output terminal 503 of the control circuit 50.

The operation of the control circuit 50 is explained below. A start signal from the timing pulse circuit 530 causes the A-D converter 510 to convert the analog signal to a digital signal, memorize the converted signal, and generate the memorized signal. At about the same time, a count start signal from the timing pulse circuit 530 causes the count circuit 540 to count the number of pulses from the shaping circuit 520, memorize the number of pulses, and generate the memorized value.

Figure 3:
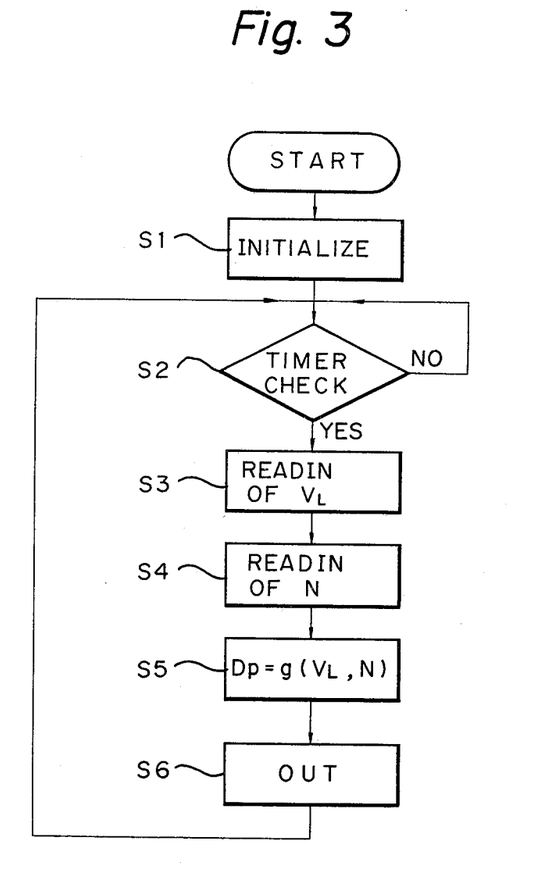
FIG. 3 is a flow chart illustrating the controlling operation of the control circuit in FIG. 1.

The operation of the microcomputer 550 is explained below with reference to the flow chart of FIG. 3. Application of power instantly starts the operation. In the first step (S1), all memories in the microcomputer 550 are initialized. The second step (S2) is the timer check and decides whether a signal from the timing pulse circuit 530 came or not. The output pulse of the timing pulse circuit 530 has a frequency of 20 Hz. The pulse is at a high level for approximately 0.2 milliseconds and is at a low level during the rest of the period. Namely, the second step decides whether the level of the pulse is high. If it is not, i.e., NO, the operation returns to the second step. If it is, i.e., YES, the operation proceeds to the third step (S3). At the second step, the decision of the level of the pulse can be performed within approximately 50 microseconds, therefore the pulse width of 0.2 milliseconds is sufficient. At the third step, a value $V_L$, which is memorized in the memory of the A-D converter 510, is read into the microcomputer 550. At the fourth step (S4), a value N, which is memorized in the memory of the count circuit 540, is read into the microcomputer 550. At the fifth step (S5), the predetermined amount of EGR in a map is read out by the parameters of the value $V_L$, which indicates a fuel pump opening degree, and the value N, which indicates the engine speed. The readout amount of EGR is interpolated to obtain a value $D_P$.

The D-A converter 560 converts the binary code signal from the microcomputer 550 to an analog voltage. The drive circuit 580 is a kind of constant current circuit. The resistor 585 is a current detecting resistor. The electric current passing through the transistor 584 is controlled so that the voltage applied to the non-inverting terminal of the operational amplifier 583 is equal to the voltage of the connecting point between the resistor 585 and the transistor 584.

The triangular wave generated from the triangular wave generator 570 is applied to the non-inverting input of the operational amplifier 583 through the resistor 582. This is to reduce the effect of hysteresis between the movement of the plunger 66 and the electric current through the solenoid coil 65. The hysteresis is caused by the friction between the plunger 66 and the solenoid casing 64. Accordingly, the waveform of the drive circuit 580 becomes the waveform of the output voltage of the D-A converter 560 with the triangular wave superposed. The frequency of the triangular wave is approximately 300 Hz.

The vacuum led from the vacuum pump 2 is not always constant, due to the engine speed and other conditions. However, the value of the vacuum in the vacuum chamber 630 is determined only by the value of the electric current conducted through the solenoid coil 65. The reason for this is that the force pushing the spool valve body 61 upward is the sum of the electromagnetic force Fm by the solenoid coil 65 and the force $F_P$ which is the product of the pressure difference P between the inner surface and the outer surface of the diaphragm 63 and the effective area A of the diaphragm 63. The force against the above-mentioned forces is the force $F_S$ of the spring 62, which is the sum of Kx and $F_{SO}$. The force (Fm+$F_P$) pushing up the spool valve body 61 is balanced with the force $F_S$. Therefore, the next equation is obtained.

$$P = \frac{Kx + F_{SO} - Fm}{A}$$

where $F_{SO}$ is a preset load of the spring 62, x is the distance to which the spool valve body 61 move upward, and K is an elastic coefficient of the spring 62. Although a change of the vacuum from the vacuum pump 2 changes the distance x, if the preset load $F_{SO}$ and the electromagnetic force Fm are sufficiently great compared with the force Kx, the pressure difference P is determined only by $F_{SO}$ and Fm. Further, the value of Fm which gives the optimum EGR is response to the operating conditions of the engine, is memorized in the microcomputer 550, therefore the optimum EGR in response to the operating conditions of the engine is obtained by reading out the Fm from the memory in the microcomputer 550.

In the case of rapid changes in the driving conditions, the value of Fm will change sharply, however, the pressure in the vacuum chamber 630 will be able to respond quickly to the newly changed value. This is because whenever the pressure differs from that needed to balance the new value of Fm, the position of the spool valve body 61 also simultaneously changes the sectional area of the passage of the vacuum port 602 and the atmosphere port 601, thus enabling a much faster response of the pressure in the vacuum chamber 630 to the change in the Fm than with changing the pressure by a just the inflow of a fixed orifice.

Figure 4:
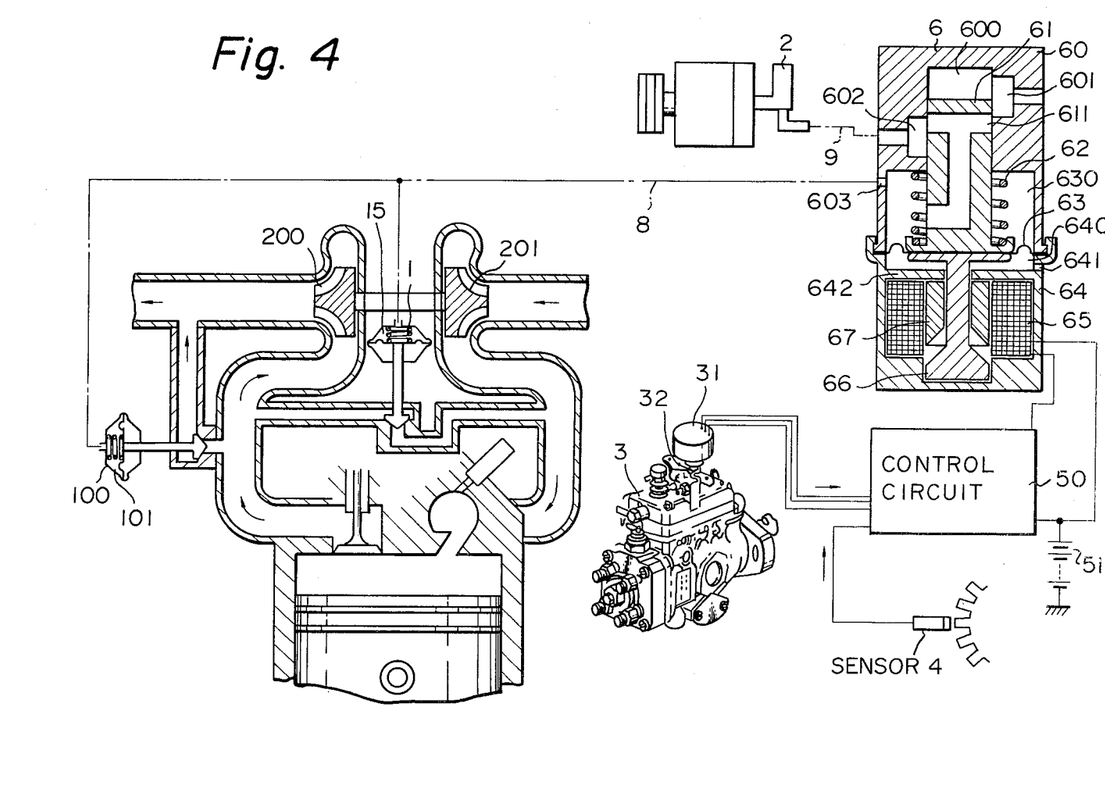
FIG. 4 is a schematic diagram illustrating the constitution of an apparatus according to a second embodiment of the present invention.

In FIG. 4, an apparatus according to a second embodiment of the present invention is shown. In this embodiment, the apparatus for controlling EGR is applied to a diesel engine having a supercharging exhaust gas turbine. The apparatus has a turbocharger to supercharge the diesel engine and the turbocharger includes an exhaust gas turbine 200, a compressor turbine 201, and a waste-gate valve 100. In this application, pressure, the value of which is same as that supplied into a first diaphragm chamber 15 to drive the EGR valve 1, is also supplied to a second diaphragm chamber 101 which drives the waste-gate valve 100 to bypass the exhaust gas turbine 200. Thus, when the EGR valve 1 is open, the waste-gate valve 100 is opened. The reason for this is if the engine is supercharged at the low or medium load region requiring EGR, this would only increase the friction loss and would be of no advantage. The apparatus is otherwise the same as that according to the first embodiment.

Figure 5:
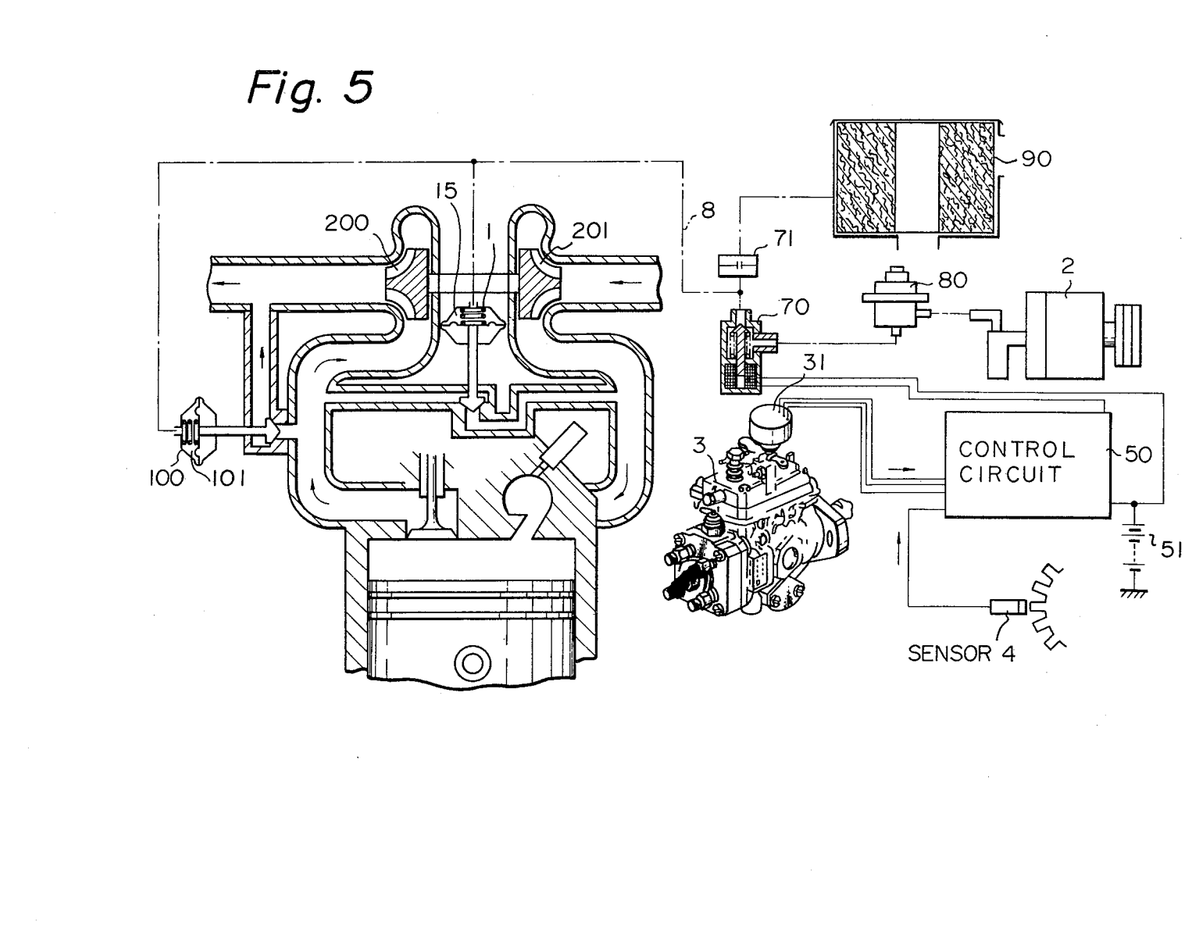
FIG. 5 is a schematic diagram illustrating the constitution of an apparatus according to a third embodiment of the present invention.

In FIG. 5, an apparatus according to a third embodiment of the present invention is shown. This embodiment is similar to the apparatus of the second embodiment, but features a different method for supplying vacuum. The control circuit 50 receives the engine speed detecting signal and the load detecting signal and based thereupon controls the supply of electric current, i.e., the ratio of conducting time to nonconducting time, to a vacuum switching valve 70. An air path is provided at one port of the vacuum switching valve 70 leading through an orifice 71 from the atmosphere or the inside of the element of an air cleaner 90. The diameter of the orifice corresponds to the minimum sectional area in the path. A constant pressure to the atmosphere is always supplied to the other port of the vacuum switching valve 70 by the vacuum pump 2 and a constant-pressure valve 80.

Figure 6:
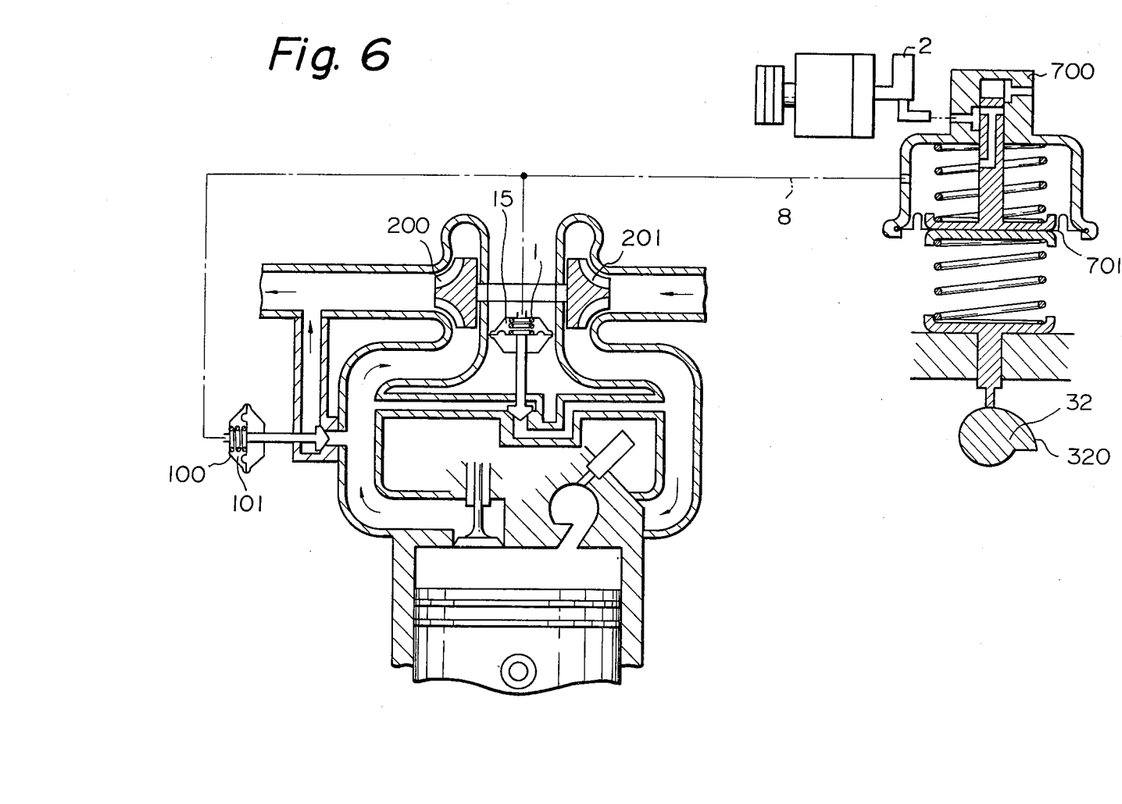
FIG. 6 is a schematic diagram illustrating the constitution of an apparatus according to a fourth embodiment of the present invention.

In FIG. 6, an apparatus according to a fourth embodiment of the present invention is shown. This apparatus, is similar to the apparatus of the second and the third embodiments, but features a still further different method for supplying vacuum. A cam 320 is linked to the rotary shaft 32 of the fuel pump for adjusting fuel injection. Rotation of the rotary shaft 32 counterclockwise increases the injection of fuel. The vacuum supplied to a pipe 8 is changed by changing the pressure setting of a constant-pressure valve 700, comprised of a spool valve and a diaphragm 701, by the rotary angle of the rotary shaft 32.

According to this invention, there are no restrictions on which means are used to supply vacuum in response to the engine conditions. Further, the supply of common vacuum to the diaphragm chamber 101 of the waste-gate valve 100 in the supercharger and the diaphragm chamber 15 of the EGR valve 1 enables reduction of the driving loss of the supercharger can be reduced when EGR is carried out under a light load.

We claim:

1. An apparatus for controlling exhaust gas recirculation in a diesel engine comprising:
   sensors for detecting the operating condition of the diesel engine;
   a control circuit for receiving the signal from said sensors and for generating the control signal to control the amount of EGR;
   a pump for generating control pressure;
   a pressure control valve for controlling the control pressure from said pump to a predetermined value, having a sleeve, a spool valve provided in said sleeve to slide along, a diaphragm for driving said spool valve in response to said control pressure, and an electromagnetic means for supplying the electromagnetic force to said spool valve, and said predetermined value being changed by the signal supplied to said electromagnetic means; and an EGR valve for adjusting the amount of EGR, having a diaphragm chamber for receiving the control pressure from said pressure control valve, and changing the opening degree thereof in response to the control pressure.

2. An apparatus according to claim 1, wherein said control circuit comprises a microcomputer, and said microcomputer is operated according to following steps:

starting by the application of power;
initializing all memories;
timer checking and deciding whether a signal from the timing pulse circuit came or not, if NO, the operation returning to timer checking step;
reading a value $V_L$ indicating a fuel pump opening degree thereinto;
reading a value N indicating the engine speed thereinto;
reading out of a map by the parameters of $V_L$ and N, and interpolating the mapped data to a value $D_p$; and
outputting the $D_p$ and returning back to timer checking step.

3. An apparatus according to claim 1, wherein said control circuit comprises:

an analog-to-digital converter for receiving the signal from said sensor;
a shaping circuit for shaping the signal from said sensor;
a timing pulse circuit for generating the A-D conversion timing signal to said A-D converter;
a count circuit for receiving the counting timing signal from said timing pulse circuit and for counting the output pulses from said shaping circuit;
a microcomputer having a central processing unit, an input/output unit, a read only memory, and a random access memory, and for receiving the outputs of said A-D converter, said timing pulse circuit and said count circuit;
a digital-to-analog converter for receiving the output of said microcomputer;
a triangular wave generator for generating the triangular wave; and
a drive circuit for receiving the outputs of said D-A converter and said triangular wave generator and for supplying the output thereof to said electromagnetic means.

4. An apparatus according to claim 1, wherein said pressure control valve further comprises a valve casing and said spool valve comprises a spool valve body, and said spool valve body has a path opening to an atmosphere port and/or a vacuum port and also opening to a vacuum chamber defined by said diaphragm and said valve casing.

5. An apparatus according to claim 1, wherein said electromagnetic means comprises an solenoid coil and a plunger movable in said solenoid coil and linked to said diaphragm.

6. An apparatus for controlling the EGR in a diesel engine, having a turbocharger including exhaust gas turbine, said apparatus comprising:

sensors for detecting the operating conditions of the diesel engine;
a control circuit for receiving the signal from said sensors and for generating the control signal to control the amount of EGR;
a pump for generating control pressure;
a pressure control valve for controlling the control pressure from said pump to a predetermined value, having an electromagnetic means, and said predetermined value being changed by the signal supplied to said electromagnetic means;
an EGR valve for adjusting the amount of EGR, having a first diaphragm chamber for receiving the control pressure from said pressure control valve, and changing the opening degree thereof in response to the control pressure; and
a waste-gate valve for adjusting the amount of exhaust gas bypassing the exhaust gas turbine, having a second diaphragm chamber for receiving the control pressure from said pressure control valve, and changing the opening degree thereof in response to the control pressure.

7. An apparatus according to claim 6 wherein said pressure control valve further comprises:

a valve casing;
a sleeve;
a spool valve provided in said sleeve to slide along;
a diaphragm for driving said spool valve in response to said control pressure;
a spring for supplying a force against the electromagnetic force due to said electromagnetic means; and
a chamber surrounded by said valve casing and said diaphragm;
the path of said spool valve at one side opening to an atmosphere port opening to the atmosphere and/or a port connected from said pump and at the other side opening to said chamber.

8. An apparatus according to claim 6, wherein when the opening degree of said EGR valve becomes great, the opening degree of said waste-gate valve becomes great.

* * * * *